United States Patent
Nakano et al.

(10) Patent No.: US 10,214,214 B2
(45) Date of Patent: Feb. 26, 2019

(54) VEHICLE CONTROL DEVICE AND CONTROL METHOD THEREFOR

(71) Applicant: JATCO Ltd, Fuji-shi, Shizuoka (JP)

(72) Inventors: Yusuke Nakano, Yamato (JP); Yusuke Ota, Ebina (JP); Yoshimasa Nishihiro, Zama (JP); Masayoshi Nakasaki, Isehara (JP); Yukifumi Ootsuka, Isehara (JP); Takuro Kawasumi, Ebina (JP); Shintaro Oshio, Sagamihara (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 15/553,229

(22) PCT Filed: Feb. 17, 2016

(86) PCT No.: PCT/JP2016/054559
§ 371 (c)(1),
(2) Date: Aug. 24, 2017

(87) PCT Pub. No.: WO2016/147784
PCT Pub. Date: Sep. 22, 2016

(65) Prior Publication Data
US 2018/0037229 A1    Feb. 8, 2018

(30) Foreign Application Priority Data
Mar. 17, 2015 (JP) ................... 2015-053545

(51) Int. Cl.
*B60W 10/02* (2006.01)
*B60W 30/18* (2012.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC ....................................................... B60W 10/02
See application file for complete search history.

(56) References Cited

U.S. PATENT DOCUMENTS 8,992,380 B2 * 3/2015 Tatewaki ............... F16H 61/12
477/45
9,097,315 B2 * 8/2015 Aoyama .................. F16H 9/16
(Continued)

FOREIGN PATENT DOCUMENTS

JP          2013-213557 A     10/2013

*Primary Examiner* — Derek D Knight
(74) *Attorney, Agent, or Firm* — Foley & Lardner LLP

(57) ABSTRACT

A vehicle control device includes control means for executing coasting control to disengage a friction engaging element and set a rotation speed of a rotary shaft of a drive source at zero when a predetermined condition is established, the predetermined condition including at least a condition according to which an accelerator pedal is not depressed. The control means starts the coasting control after predicting that an actual speed ratio of a continuously variable transmission will be modifiable to a target speed ratio of the coasting control during the coasting control, even in a case where the accelerator pedal is not depressed but the actual speed ratio has not yet reached the target speed ratio.

8 Claims, 11 Drawing Sheets

(51) Int. Cl.
*B60W 10/06* (2006.01)
*F16H 59/18* (2006.01)
*F16H 59/44* (2006.01)
*F16H 61/02* (2006.01)
*F16H 61/662* (2006.01)
*F16H 63/50* (2006.01)
*F16D 48/02* (2006.01)
*B60W 10/107* (2012.01)
*B60W 50/00* (2006.01)
*B60W 10/30* (2006.01)

(52) U.S. Cl.
CPC .......... *B60W 10/107* (2013.01); *B60W 10/30* (2013.01); *B60W 50/0097* (2013.01); *F16D 48/02* (2013.01); *F16H 59/18* (2013.01); *F16H 59/44* (2013.01); *F16H 61/02* (2013.01); *F16H 61/662* (2013.01); *F16H 63/50* (2013.01); *B60W 2030/1809* (2013.01); *B60W 2510/1005* (2013.01); *B60W 2540/10* (2013.01); *B60W 2540/12* (2013.01); *B60W 2710/021* (2013.01); *B60W 2710/0655* (2013.01); *B60W 2710/1005* (2013.01); *B60W 2710/1083* (2013.01); *Y02T 10/76* (2013.01)

(56) References Cited

U.S. PATENT DOCUMENTS

| | | | |
|---|---|---|---|
| 9,334,933 B2* | 5/2016 | Aoyama | F16H 9/16 |
| 9,421,978 B2* | 8/2016 | Inoue | B60W 10/04 |
| 9,975,545 B2* | 5/2018 | Banshoya | B60K 6/365 |
| 2018/0037229 A1* | 2/2018 | Nakano | B60W 10/02 |

* cited by examiner

VEHICLE CONTROL DEVICE AND CONTROL METHOD THEREFOR

TECHNICAL FIELD

The present invention relates to a vehicle control device and a control method therefor.

BACKGROUND ART

JP2013-213557A discloses a vehicle in which coasting control is executed by disengaging a friction engaging element and stopping an engine when a coasting condition is established.

SUMMARY OF INVENTION

The coasting control described above may be applied to a vehicle installed with a continuously variable transmission.

When the engine is stopped during the coasting control, an oil pump driven by the engine is also stopped, and therefore no oil is discharged from the oil pump. Accordingly, oil pressure is no longer supplied to the continuously variable transmission, and as a result, it may be impossible to modify a speed ratio of the continuously variable transmission to a desired speed ratio while the coasting control is underway.

To solve this problem, coasting may be started after modifying the speed ratio of the continuously variable transmission to the desired speed ratio. The coasting control is implemented in a condition where an accelerator pedal is not depressed, and therefore the coasting control is preferably started after modifying the speed ratio of the continuously variable transmission to Highest, for example.

In a vehicle that is capable of executing coasting control in this manner, the coasting control is not started until the speed ratio of the continuously variable transmission is set at Highest, for example, even when a driver releases the accelerator pedal with the intention of coasting.

However, it may be possible to modify the speed ratio of the continuously variable transmission to Highest using oil pressure remaining in an oil pressure circuit even after the friction engaging element has been disengaged and the engine has been stopped. In this case, the coasting control can be started early, and as a result, a further improvement in fuel efficiency can be expected.

An object of the present invention is to achieve an improvement in fuel efficiency by appropriately determining a start timing for starting coasting control.

According to one aspect of this invention, a vehicle control device for controlling a vehicle, the vehicle includes an oil pump driven by a drive source, a continuously variable transmission disposed between the drive source and a drive wheel such that oil discharged from the oil pump is supplied thereto, and a friction engaging element disposed in series with the continuously variable transmission between the drive source and the drive wheel, the vehicle control device includes control means configured to execute coasting control to disengage the friction engaging element and set a rotation speed of a rotary shaft of the drive source at zero when a predetermined condition, which includes at least a condition according to which an accelerator pedal is not depressed, is established, wherein the control means is configured to start the coasting control after predicting that an actual speed ratio of the continuously variable transmission will be modifiable to a target speed ratio of the coasting control during the coasting control, even in a case where the accelerator pedal is not depressed but the actual speed ratio has not yet reached the target speed ratio.

According to another aspect of this invention, a vehicle control method for controlling a vehicle, the vehicle includes an oil pump driven by a drive source, a continuously variable transmission disposed between the drive source and a drive wheel such that oil discharged from the oil pump is supplied thereto, and a friction engaging element disposed in series with the continuously variable transmission between the drive source and the drive wheel, the vehicle control method includes executing coasting control to disengage the friction engaging element and set a rotation speed of a rotary shaft of the drive source at zero when a predetermined condition, which includes at least a condition according to which an accelerator pedal is not depressed, is established, and starting the coasting control after predicting that an actual speed ratio of the continuously variable transmission will be modifiable to a target speed ratio of the coasting control during the coasting control, even in a case where the accelerator pedal is not depressed but the actual speed ratio has not yet reached the target speed ratio.

According to these aspects, the timing at which to start the coasting control can be advanced, and as a result, the fuel efficiency or electrical efficiency of the drive source can be improved.

DESCRIPTION OF EMBODIMENTS

Embodiments of the present invention will be described below with reference to the attached figures. It should be noted that in the following description, a "speed ratio (gear position)" of a certain transmission mechanism is a value obtained by dividing an input rotation speed of the transmission mechanism by an output rotation speed of the transmission mechanism, and a large speed ratio (gear position) will be referred to as "Low", while a small speed ratio (gear position) will be referred to as "High".

Figure 1:
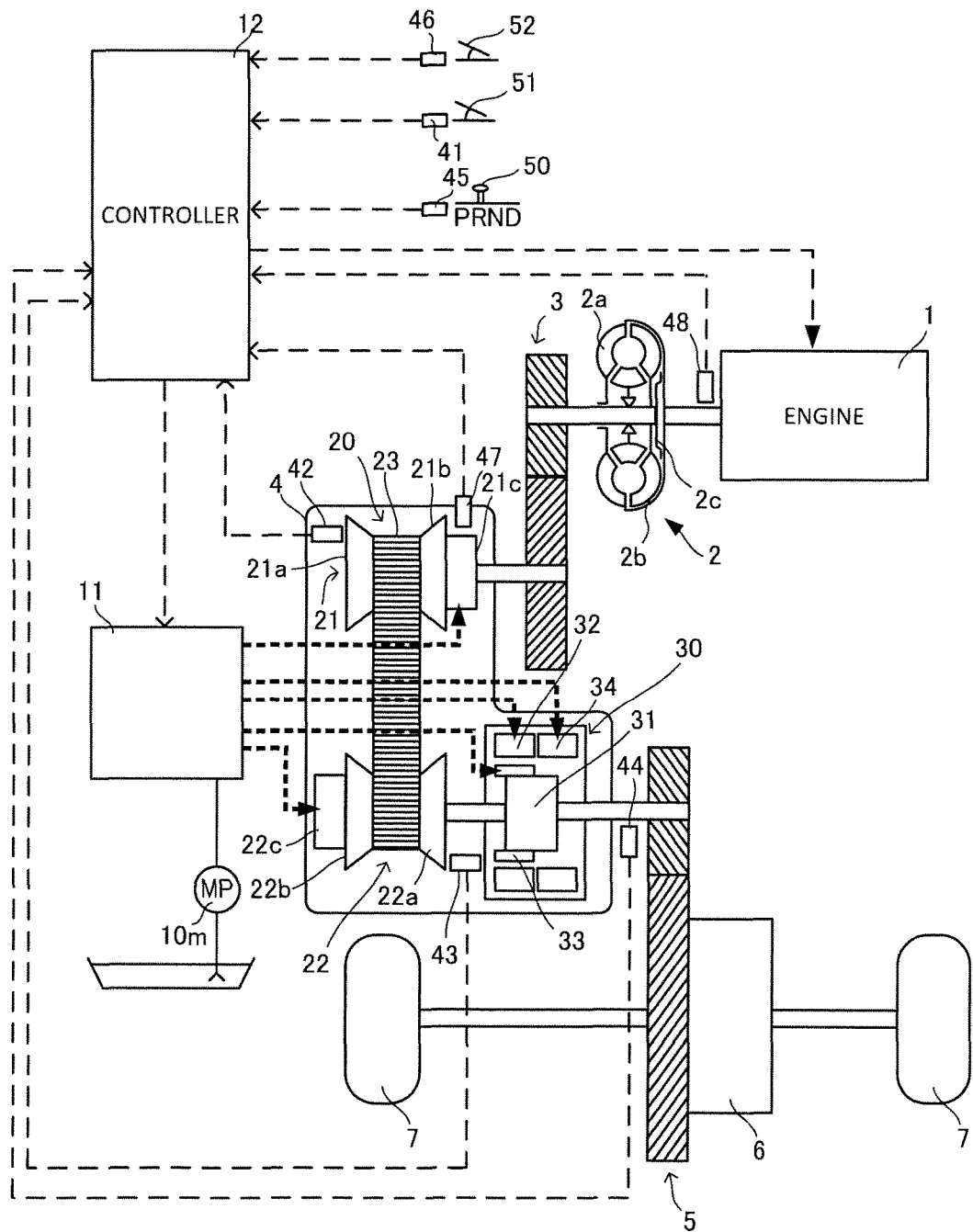
FIG. 1 is a schematic view showing a configuration of a vehicle according to a first embodiment.

FIG. 1 is a schematic view showing a configuration of a vehicle according to this embodiment of the present invention. The vehicle includes an engine 1 as a drive source, output rotation from the engine 1 being input into a pump impeller 2a of a torque converter 2 having a lockup clutch 2c and then transmitted from a turbine runner 2b to drive wheels 7 via a first gear train 3, a transmission 4, a second gear train 5, and a differential device 6.

The transmission 4 is provided with a mechanical oil pump 10m that receives the rotation of the engine 1 and is driven using a part of the power of the engine 1. The transmission 4 is also provided with an oil pressure control circuit 11 that adjusts an oil pressure (referred to hereafter as a line pressure PL) generated by oil discharged from the mechanical oil pump 10m, and supplies the adjusted oil pressure to respective sites of the transmission 4.

The transmission 4 includes a belt type continuously variable transmission mechanism (referred to hereafter as a "variator 20") that serves as a friction transmission mechanism, and a sub-transmission mechanism 30 provided in series with the variator 20. "Provided in series" means that the variator 20 and the sub-transmission mechanism 30 are provided in series on a power transmission path from the engine 1 to the drive wheels 7. The sub-transmission mechanism 30 may be connected directly to an output shaft of the variator 20, as in this example, or may be connected thereto via another transmission mechanism or power transmission mechanism (a gear train, for example).

The variator 20 includes a primary pulley 21, a secondary pulley 22, and a V belt 23 wound around the pulleys 21, 22.

The primary pulley 21 includes a fixed conical plate 21a that rotates integrally with an input shaft, and a movable conical plate 21b that is disposed opposite the fixed conical plate 21a so as to form a V-shaped pulley groove therewith, and that can be displaced in an axial direction by an oil pressure (referred to hereafter as a primary pulley pressure Ppri) acting on a primary pulley cylinder chamber 21c.

The secondary pulley 22 includes a fixed conical plate 22a that rotates integrally with the output shaft, and a movable conical plate 22b that is disposed opposite the fixed conical plate 22a so as to form a V-shaped pulley groove therewith, and that can be displaced in the axial direction in accordance with an oil pressure (referred to hereafter as a secondary pulley pressure Psec) acting on a secondary pulley cylinder chamber 22c.

In the variator 20, respective widths of the V grooves vary in accordance with the primary pulley pressure Ppri and the secondary pulley pressure Psec, causing contact radii between the V belt 23 and the respective pulleys 21, 22 to vary, and as a result, an actual speed ratio ia of the variator 20 varies continuously.

The sub-transmission mechanism 30 is a two-forward speed/one-reverse speed transmission mechanism. The sub-transmission mechanism 30 includes a Ravigneaux type planetary gear mechanism 31 in which carriers of two planetary gears are coupled to each other, and a plurality of friction engaging elements (a Low brake 32, a High clutch 33, and a Rev brake 34) that are connected to a plurality of rotary elements constituting the Ravigneaux type planetary gear mechanism 31 in order to modify engagement conditions thereof. The gear position of the sub-transmission mechanism 30 is modified by adjusting the oil pressure supplied to the respective friction engaging elements 32 to 34 so as to modify respective engagement/disengagement conditions of the friction engaging elements 32 to 34.

When the Low brake 32 is engaged and the High clutch 33 and Rev brake 34 are disengaged, the gear position of the sub-transmission mechanism 30 shifts to a first speed. When the High clutch 33 is engaged and the Low brake 34 and Rev brake 34 are disengaged, the gear position of the sub-transmission mechanism 30 shifts to a second speed. Further, when the Rev brake 34 is engaged and the Low brake 32 and High clutch 33 are disengaged, the gear position of the sub-transmission mechanism 30 shifts to reverse.

By modifying the actual speed ratio is of the variator 20 and the gear position of the sub-transmission mechanism 30, a through speed ratio if serving as an overall speed ratio of the transmission 4 is modified.

Figure 2:
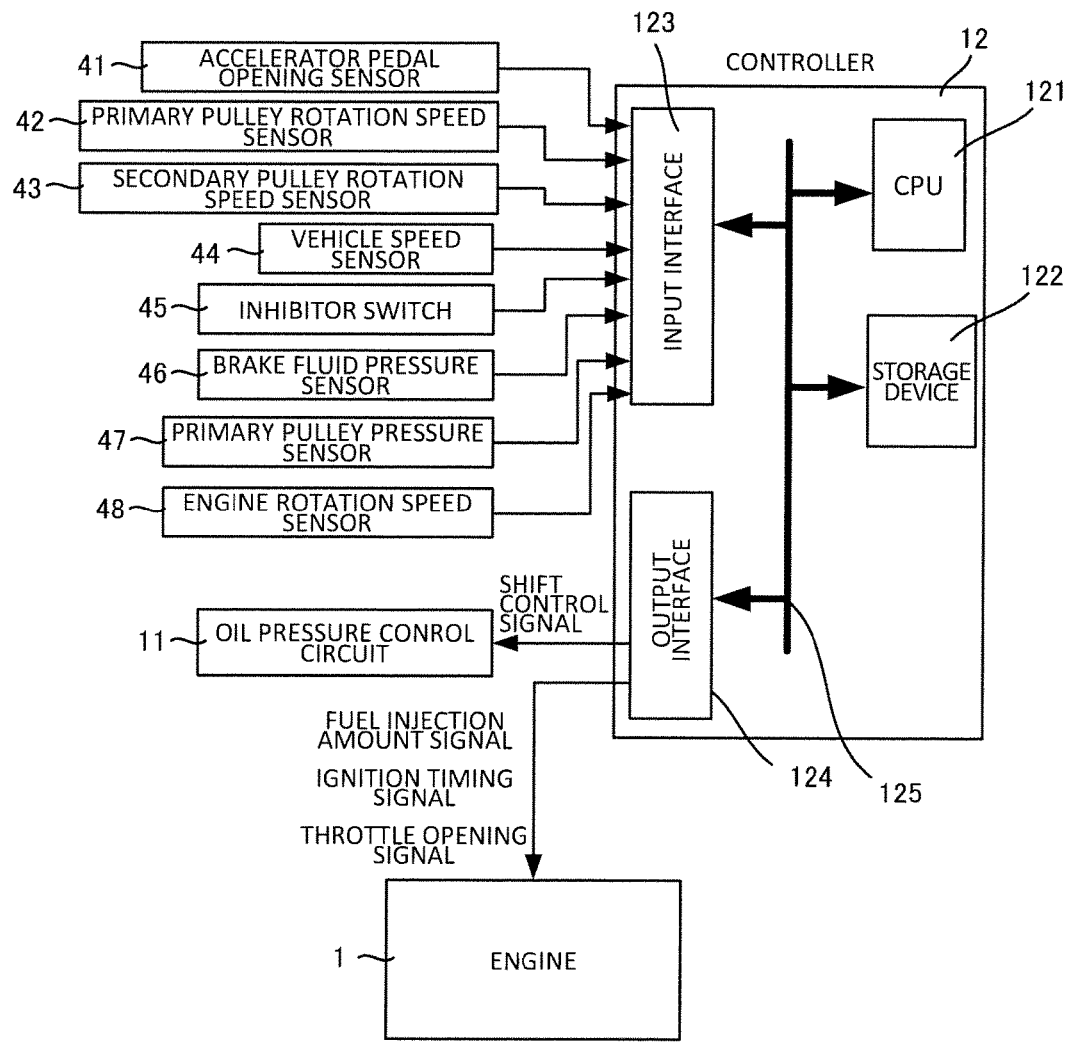
FIG. 2 is a block diagram illustrating a controller.

A controller 12 performs overall control of the engine 1 and the transmission 4, and as shown in FIG. 2, the controller 12 is constituted by a CPU 121, a storage device 122 including RAM and ROM, an input interface 123, an output interface 124, and a bus 125 connecting these components to each other.

An output signal from an accelerator pedal opening sensor 41 that detects an accelerator pedal opening APO, which is an operation amount of an accelerator pedal 51, an output signal from a primary pulley rotation speed sensor 42 that detects a primary pulley rotation speed Npri, an output signal from a secondary pulley rotation speed sensor 43 that detects a secondary pulley rotation speed Nsec, an output signal from a vehicle speed sensor 44 that detects a vehicle speed VSP, an output signal from an inhibitor switch 45 that detects a position of a shift lever 50, an output signal from a brake fluid BRP pressure sensor 46 that detects a brake fluid pressure BRP corresponding to an operation amount of a brake pedal 52, an output signal from a primary pulley pressure sensor 47 that detects the primary pulley pressure Ppri, an output signal from an engine rotation speed sensor 48 that detects a rotation speed of a rotary shaft of the engine 1 (referred to hereafter as an engine rotation speed Ne), and so on are input into the input interface 123.

The storage device 122 stores a control program for the engine 1, a shift control program for the transmission 4, and various maps and tables used by these programs. The CPU 121 reads and executes the programs stored in the storage device 122, generates a fuel injection amount signal, an ignition timing signal, a throttle opening signal, and a shift control signal by implementing various types of calculation processing on the various signals input therein via the input interface 123, and outputs the generated signals to the engine 1 and the oil pressure control circuit 11 via the output interface 124. Various values used by the CPU 121 during the calculation processing, and calculation results obtained in relation thereto, are stored as appropriate in the storage device 122.

The oil pressure control circuit 11 is constituted by a plurality of flow passages and a plurality of oil pressure control valves. The oil pressure control circuit 11 switches an oil pressure supply path by controlling the plurality of oil pressure control valves on the basis of the shift control signal from the controller 12, prepares a required oil pressure from the line pressure PL generated by the oil discharged from the mechanical oil pump 10m, and supplies the required oil pressure to the respective sites of the transmission 4. In so doing, the actual speed ratio is of the variator 20 and the gear position of the sub-transmission mechanism 30 are modified, whereby the transmission 4 implements a shift.

In this embodiment, coasting control, in which coasting is performed by disengaging the respective friction engaging elements 32 to 34 of the sub-transmission mechanism 30 and halting fuel injection into the engine 1 so that the engine rotation speed Ne falls to zero, can be executed when the accelerator pedal 51 is not depressed and so on. By executing the coasting control, deceleration by engine braking is prevented, a coasting distance is increased, and travel implemented by driving the engine 1 is reduced while coasting to a desired position. As a result, the fuel efficiency of the engine 1 can be improved.

When the coasting control is terminated and the Low brake 32 or the High clutch 33 of the sub-transmission mechanism 30 is engaged, it is necessary to align rotation speeds on the front and rear of the Low brake 32 or the High clutch 33 to suppress engagement shock generated when the Low brake 32 or the High clutch 33 is engaged, and for this purpose, it is necessary to ascertain the actual speed ratio ia of the variator 20. During the coasting control, however, the engine rotation speed Ne remains at zero while the vehicle travels such that the primary pulley 21 and secondary pulley 22 of the variator 20 do not rotate, and therefore the actual speed ratio ia of the variator 20 cannot be calculated from the primary pulley rotation speed Npri and the secondary pulley rotation speed Nsec.

In this case, after terminating the coasting control, first, the engine 1 is restarted so as to secure an amount of oil discharged from the mechanical oil pump 10m, and then the actual speed ratio ia is calculated from the primary pulley rotation speed Npri and the secondary pulley rotation speed Nsec. Then, the actual speed ratio ia is modified to a predetermined speed ratio. After that, The Low brake 32 or the High clutch 33 is engaged by supplying to the Low brake 32 or the High clutch 33. As a result, a time lag occurs while the actual speed ratio ia is calculated and the actual speed ratio ia is modified to the predetermined speed ratio.

In this embodiment, the coasting control described below is executed. According to this coasting control, the actual speed ratio ia of the variator 20 is at Highest when the coasting control is terminated, and therefore the Low brake 32 or the High clutch 33 can be engaged quickly following termination of the coasting control, without calculating the actual speed ratio ia of the variator 20. Moreover, the coasting control can be started early so that the amount of fuel consumed by the engine 1 is reduced, leading to an improvement in fuel efficiency.

Figure 3:
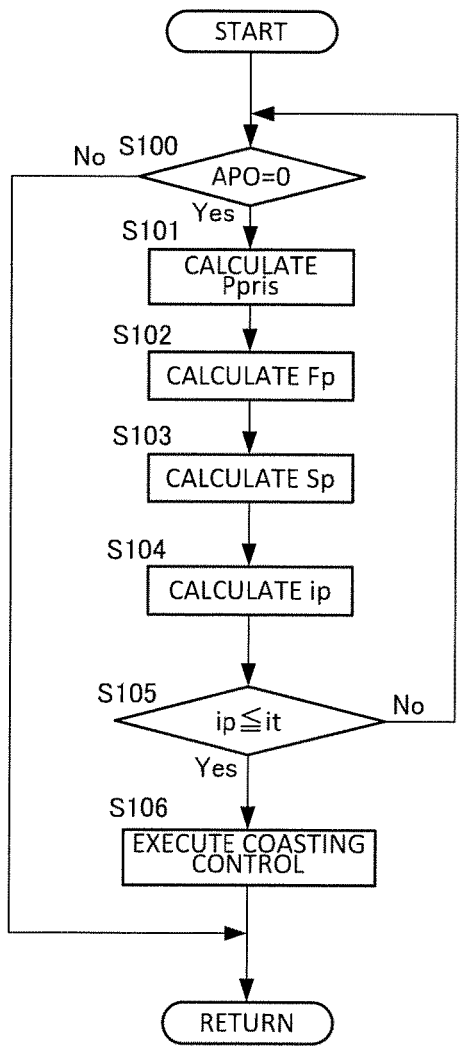
FIG. 3 is a flowchart illustrating coasting control according to the first embodiment.

Next, the coasting control according to this embodiment will be described using a flowchart shown in FIG. 3. It is assumed hereafter that the High clutch 33 of the sub-transmission mechanism 30 is engaged or disengaged.

In step S100, the controller 12 determines whether or not the accelerator pedal opening APO is zero. The controller 12 calculates the accelerator pedal opening APO on the basis of the signal from the accelerator pedal opening sensor 41, and when the accelerator pedal opening APO is zero, determines that the accelerator pedal 51 is not depressed. When the accelerator pedal opening APO is zero, the processing advances to step S101, and when the accelerator pedal opening APO is not zero, or in other words when the accelerator pedal 51 is depressed, the current processing is terminated.

In step S101, the controller 12 calculates a primary pulley pressure (referred to hereafter as a suppliable pressure Ppris) that can be supplied to the primary pulley 12 when the coasting control is executed from a current operating condition. The controller 12 calculates the engine rotation speed Ne on the basis of the signal from the engine rotation speed sensor 48, and calculates the suppliable pressure Ppris from a map or the like, for example, on the basis of the engine rotation speed Ne. The suppliable pressure Ppris is determined on the basis of an oil discharge amount characteristic of the mechanical oil pump 10m. When the engine rotation speed Ne is high, the amount of oil discharged from the mechanical oil pump 10m increases, leading to an increase in the suppliable pressure Ppris.

In step S102, the controller 12 calculates a differential thrust Fp of the primary pulley 21 when the coasting control is executed from the current operating condition. The differential thrust Fp is a force for moving the movable conical plate 21b of the primary pulley 21 to the fixed conical plate 21a side by a differential pressure between the suppliable pressure Ppris and the current primary pulley pressure Ppri. The controller 12 calculates the current primary pulley pressure Ppri on the basis of the signal from the primary pulley pressure sensor 47, and calculates the differential thrust Fp by multiplying a pressure-receiving surface area of the primary pulley 21 by the differential pressure between the suppliable pressure Ppris calculated in step S101 and the calculated primary pulley pressure Ppri.

Figure 4:
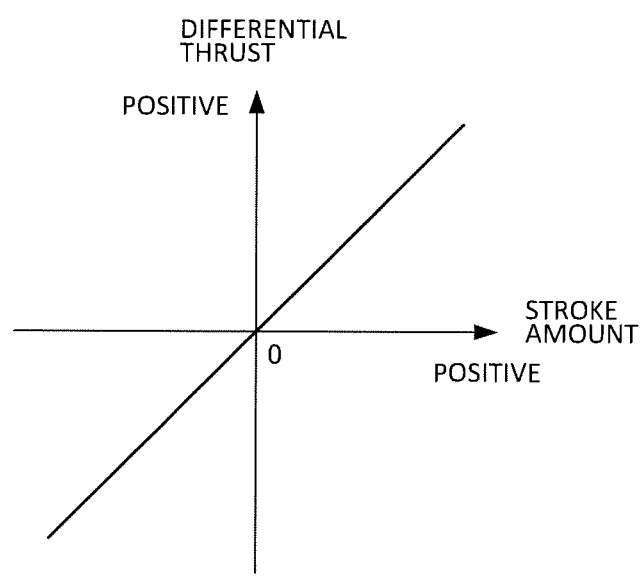
FIG. 4 is a map showing a relationship between a differential thrust and a stroke amount.

In step S103, the controller 12 calculates a stroke amount Sp by which the movable conical plate 21b of the primary pulley 21 strokes when the differential thrust Fp calculated in step S102 is generated. The controller 12 calculates the stroke amount Sp on the basis of the differential thrust Fp calculated in step S102 using a map shown in FIG. 4. FIG. 4 is a map showing a relationship between the differential thrust Fp and the stroke amount Sp. When the differential thrust Fp is positive, the stroke amount Sp takes a positive value such that the movable conical plate 21b of the primary pulley 21 moves to the fixed conical plate 21a side. When the differential thrust Fp is negative, on the other hand, the stroke amount Sp takes a negative value such that the movable conical plate 21b of the primary pulley 21 moves to an opposite side to the fixed conical plate 21a. In other words, when the differential thrust Fp is positive, the actual speed ratio ia of the variator 20 is modified to a High side, and when the differential thrust Fp is negative, the actual speed ratio ia of the variator 20 is modified to a Low side.

Figure 5:
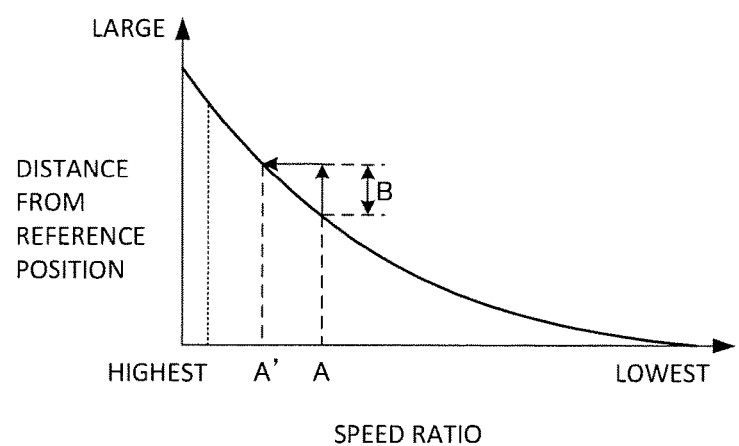
FIG. 5 is a map showing a relationship between a speed ratio and a distance of a movable conical plate of a primary pulley from a reference position.

In step S104, the controller 12 calculates an attained speed ratio ip attained by the variator 20 when the differential thrust Fp calculated in step S102 is generated. The attained speed ratio ip is the actual speed ratio ia predicted to be attained during the coasting control when the coasting control is executed on the basis of the current operating condition. The controller 12 calculates the current actual speed ratio ia of the variator 20 on the basis of the signal from the primary pulley rotation speed sensor 42 and the signal from the secondary pulley rotation speed sensor 43, and calculates the attained speed ratio ip on the basis of the actual speed ratio ia and the stroke amount Sp using a map shown in FIG. 5. FIG. 5 is a map showing a relationship between the speed ratio and a distance of the movable conical plate 21b of the primary pulley 21 from a reference position. The reference position of the movable conical plate 21b of the primary pulley 21 is a position of the movable conical plate 21b of the primary pulley 21 when the actual speed ratio ia of the variator 20 is at Lowest, and as the distance from the reference position increases, the movable conical plate 21b of the primary pulley 21 is positioned further toward the fixed conical plate 21a side such that the actual speed ratio ia of the variator 20 shifts toward the High side. In FIG. 5, when the current actual speed ratio ia corresponds to a "speed ratio A" and the stroke amount Sp corresponds to a "stroke amount B", for example, the attained speed ratio ip upon execution of the coasting control is a "speed ratio A".

In step S105, the controller 12 determines whether or not the attained speed ratio ip is at Highest, which is a target speed ratio it of the variator 20 during the coasting control, or on the High side of Highest, or in other words whether or not the attained speed ratio ip is equal to or smaller than the target speed ratio it. When the attained speed ratio ip is at Highest or on the High side of Highest, or in other words when the "speed ratio A" in FIG. 5 is at Highest or on the High side of Highest, the controller 12 determines that it will be possible to modify the actual speed ratio ia of the variator 20 to Highest following the start of the coasting control. When the attained speed ratio ip is at Highest or on the High side of Highest, the processing advances to step S106, and when the attained speed ratio ip is on the Low side of Highest, the processing returns to step S100, where the processing described above is executed.

In step S106, the controller 12 executes the coasting control. In other words, the controller 12 executes disengaging the High clutch 33 of the sub-transmission mechanism 30 and halting fuel injection into the engine 1 such that the engine rotation speed Ne falls to zero. When the coasting control is started, the suppliable pressure Ppris is actually supplied to the primary pulley 21, and therefore, during the coasting control, the actual speed ratio ia of the variator 20 reaches Highest.

Hence, according to this embodiment, when it is predicted before starting the coasting control that the actual speed ratio ia of the variator 20 will be able to reach Highest during the coasting control, the coasting control is started, and as a result, the start timing of the coasting control is advanced.

It should be noted that here, whether or not to start the coasting control is determined on the basis of the accelerator pedal opening APO and the attained speed ratio ip, but in addition to these conditions, the coasting control may be started on the condition (a predetermined condition) that the brake pedal 52 is released, and remains released continuously for a predetermined time. When it is determined that the driver does not wish either to accelerate or to stop the vehicle and that the speed ratio of the variator 20 will be able to reach Highest during the coasting control, the coasting control is actually started.

Figure 6:
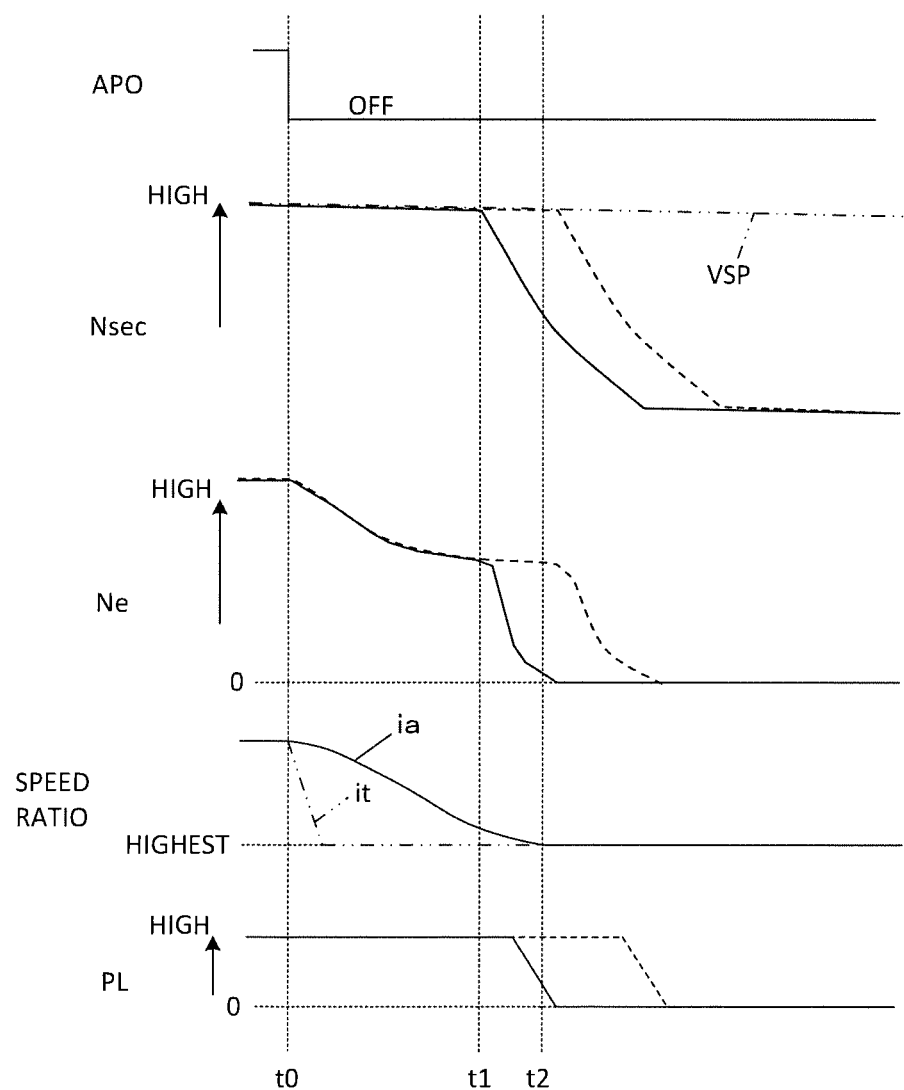
FIG. 6 is a time chart illustrating the coasting control according to the first embodiment.

Next, the coasting control according to this embodiment will be described using a time chart shown in FIG. 6. It is assumed here that the actual speed ratio ia of the variator 20 is not at Highest.

At a time t0, the accelerator pedal 51 is released such that the accelerator pedal opening APO falls to zero. Further, the target speed ratio it of the variator 20 is modified to Highest, and the actual speed ratio ia of the variator 20 is modified toward Highest. As a result, the engine rotation speed Ne decreases. Here, although the accelerator pedal opening APO falls to zero, the actual speed ratio ia of the variator 20 remains on the Low side, and therefore the attained speed ratio ip does not reach Highest and the coasting control is not started.

When it is determined at a time t1 that the attained speed ratio ip has reached Highest, the coasting control is started. Accordingly, the High clutch 33 of the sub-transmission mechanism 30 is disengaged, and therefore the secondary pulley rotation speed Nsec decreases so as to deviate from the vehicle speed VSP. Further, fuel injection into the engine 1 is halted, and therefore the engine rotation speed Ne decreases rapidly. Moreover, as the engine rotation speed Ne decreases, the amount of oil discharged from the mechanical oil pump 10*m* decreases such that the line pressure PL can no longer be maintained at a predetermined pressure, and as a result, the line pressure PL decreases. In FIG. 6, the vehicle speed VSP is indicated by a dot-dot-dash line.

When the coasting control is started, the line pressure PL decreases, but since the suppliable pressure Ppris is supplied to the primary pulley 21, the actual speed ratio ia is modified toward the Highest side, and at a time t2, the actual speed ratio ia reaches Highest.

When this embodiment is not employed, the coasting control is started at the time t2 where the actual speed ratio ia of the variator 20 reaches Highest. The secondary pulley rotation speed Nsec and the engine rotation speed Ne in a case where this embodiment is not employed are indicated by dotted lines.

According to this embodiment, the coasting control is started at an earlier timing than when this embodiment is not employed, and therefore the timing at which fuel injection into the engine 1 is stopped can be advanced, leading to a reduction in the amount of fuel consumed by the engine 1 and a corresponding improvement in fuel efficiency. Furthermore, during the coasting control, the actual speed ratio ia of the variator 20 reaches Highest, and therefore the actual speed ratio ia of the variator 20 can be ascertained so that after the coasting control is terminated, the Low brake 32 or the High clutch 33 can be engaged quickly while suppressing the occurrence of engagement shock.

Figure 7:
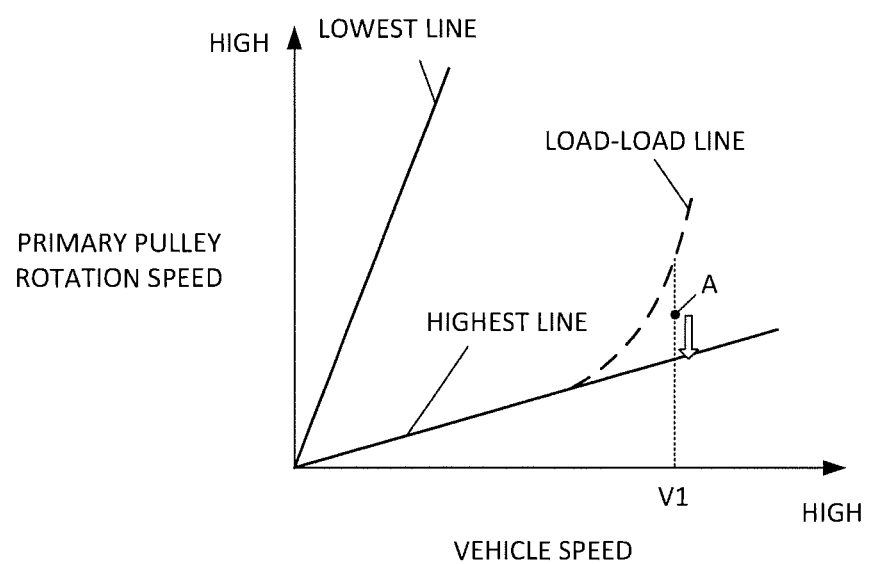
FIG. 7 is view illustrating the coasting control according to the first embodiment using a shift map.

It is assumed that the through speed ratio if of the transmission 4 is controlled on the basis of a shift line employed during travel at a certain fixed accelerator pedal opening APO and a fixed vehicle speed VSP, for example, in which driving force for counterbalancing a vehicle load such as a gradient and travel resistance is generated (a line linking points where the vehicle load and the driving force are counterbalanced is referred to hereafter as a load-load line), and that the accelerator pedal opening APO reaches zero when the vehicle speed VSP reaches a vehicle speed V1 on a shift map shown in FIG. 7. It should be noted that in the sub-transmission mechanism 30, the High clutch 33 is engaged.

In this case, when this embodiment is not employed, the coasting control is not started until the actual speed ratio ia of the variator 20, which is set at a speed ratio on the load-load line, reaches Highest. In this embodiment, however, the coasting control is started at a point, where the variator 20 is modified to a speed ratio at which an operating point of the variator 20 reaches a point A and the attained speed ratio ip is determined to have reached Highest. As a result, the start timing of the coasting control can be advanced while the speed ratio shifts toward Highest, as indicated by an arrow.

Effects of the first embodiment of the present invention will now be described.

The coasting control is started when the attained speed ratio ip is determined to be at Highest, even in a case where the accelerator pedal opening APO is at zero but the actual speed ratio ia of the variator 20 has not yet reached Highest, i.e. the target speed ratio it of the variator 20 during the coasting control. As a result, the start timing of the coasting control can be advanced, leading to a reduction in the amount of fuel consumed by the engine 1 and a corresponding improvement in the fuel efficiency of the engine 1. Further, the actual speed ratio is of the variator 20 reaches Highest during the coasting control, and therefore the Low brake 32 or the High clutch 33 can be engaged quickly while suppressing the occurrence of engagement shock following termination of the coasting control.

The coasting control is started from the point at which the attained speed ratio ip reaches Highest, and therefore the start timing of the coasting control can be advanced, enabling an improvement in the fuel efficiency of the engine 1.

The attained speed ratio ip is calculated on the basis of the differential thrust Fp, which is calculated on the basis of the current primary pulley pressure Ppri and the suppliable pressure Ppris that can be supplied when the coasting control is executed from the current operating condition. As a result, the attained speed ratio ip can be calculated by means of a simple configuration, without employing complicated calculation formulae.

Next, a second embodiment will be described.

Figure 8:
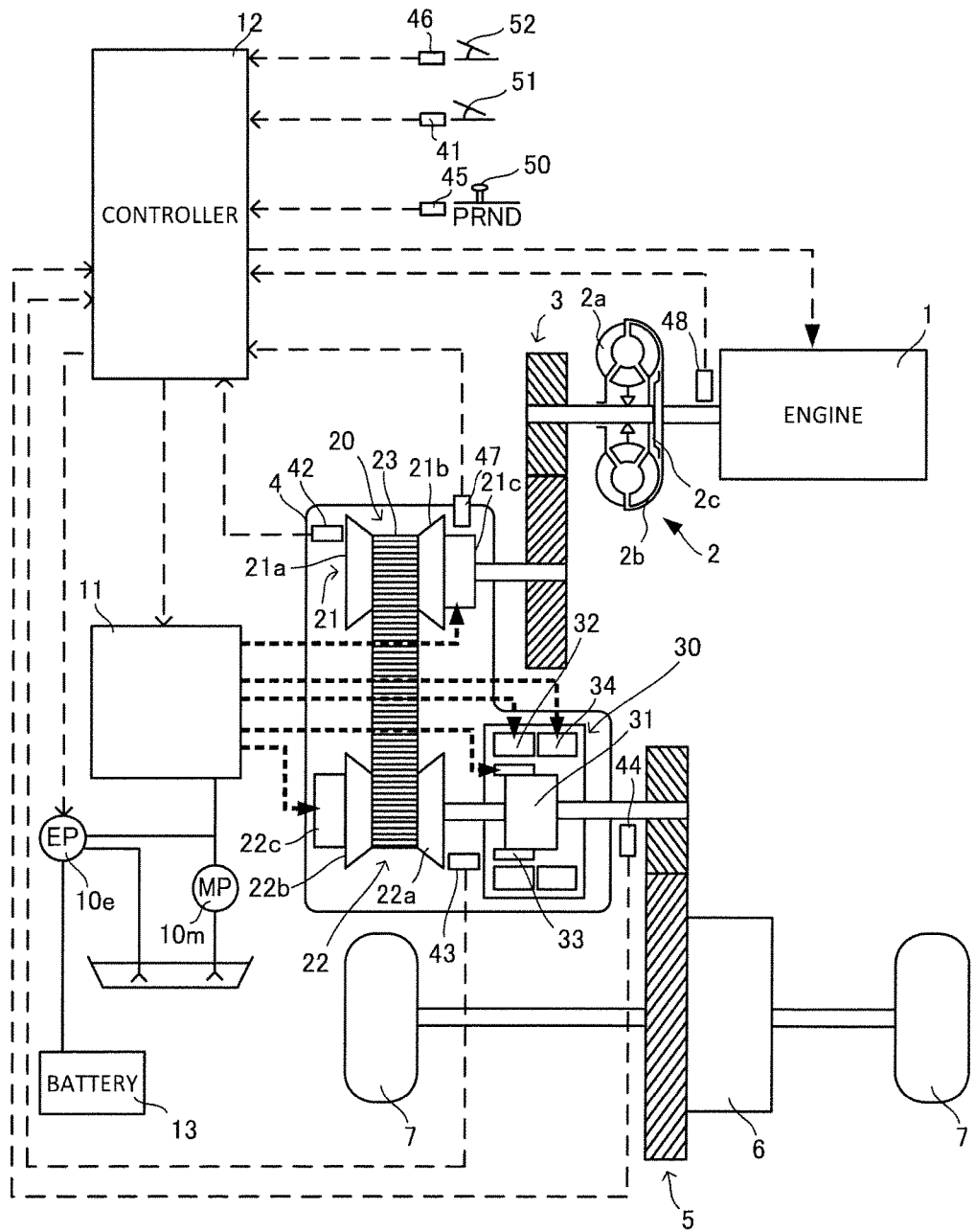
FIG. 8 is a schematic view showing a configuration of a vehicle according to a second embodiment.

As shown in FIG. 8, the transmission 4 of a vehicle according to the second embodiment is provided with an electric oil pump 10e, which is driven by a supply of power from a battery 13, in addition to the mechanical oil pump 10m. The oil pressure control circuit 11 regulates oil pressure generated by the oil discharged from the mechanical oil pump 10m and the electric oil pump 10e.

Figure 9:
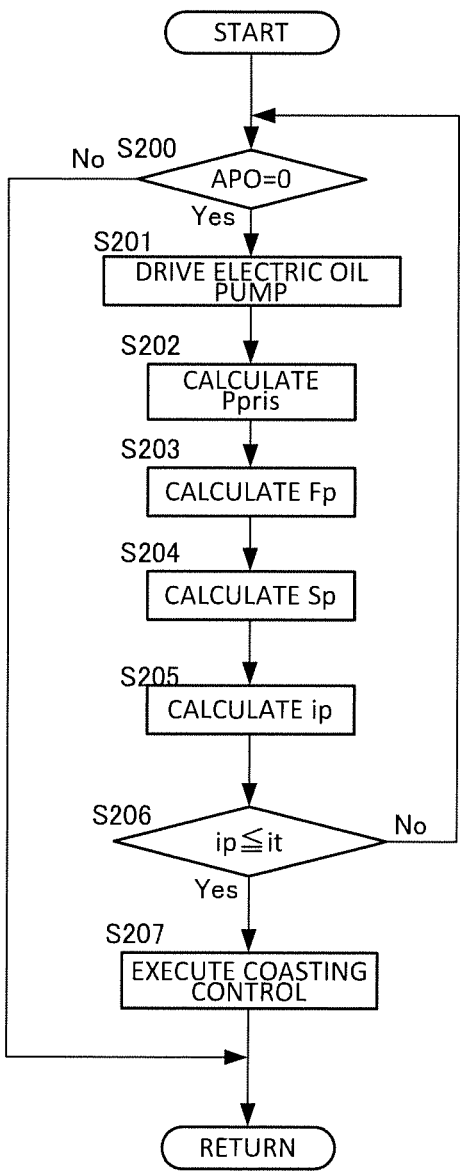
FIG. 9 is a flowchart illustrating coasting control according to the second embodiment.

Next, the coasting control according to this embodiment will be described using a flowchart shown in FIG. 9.

In step S200, the controller 12 determines whether or not the accelerator pedal opening APO is zero. When the accelerator pedal opening APO is zero, the processing advances to step S201, and when the accelerator pedal opening APO is not zero, the current processing is terminated.

In step S201, the controller 12 drives the electric oil pump 10e. The controller 12 drives the electric oil pump 10e so as to maximize a discharge amount thereof. The discharge amount of the electric oil pump 10e is maximized in consideration of oil leakage from the oil pressure control circuit 11 and so on, and also to maximize the oil pressure supplied to the primary pulley 21.

In step S202, the controller 12 calculates the suppliable pressure Ppris that can be supplied when the coasting control is executed from the current operating condition. The controller 12 calculates the suppliable pressure Ppris in consideration of the oil discharge amount characteristic of the electric oil pump 10e. More specifically, the controller 12 calculates the suppliable pressure Ppris by adding an oil pressure corresponding to the discharge amount of the electric oil pump 10e to the suppliable pressure Ppris in a case where the mechanical oil pump 10m is used alone. As a result, the suppliable pressure Ppris according to this embodiment is higher than the suppliable pressure Ppris according to the first embodiment.

Processing of step S203 to step S207 is identical to the processing of step S102 to step S106 according to the first embodiment. It should be noted that the electric oil pump 10e is controlled so that after the actual speed ratio ia reaches Highest, a minimum pressure for ensuring that belt slippage does not occur in the variator 20 is supplied to the variator 20.

Figure 10:
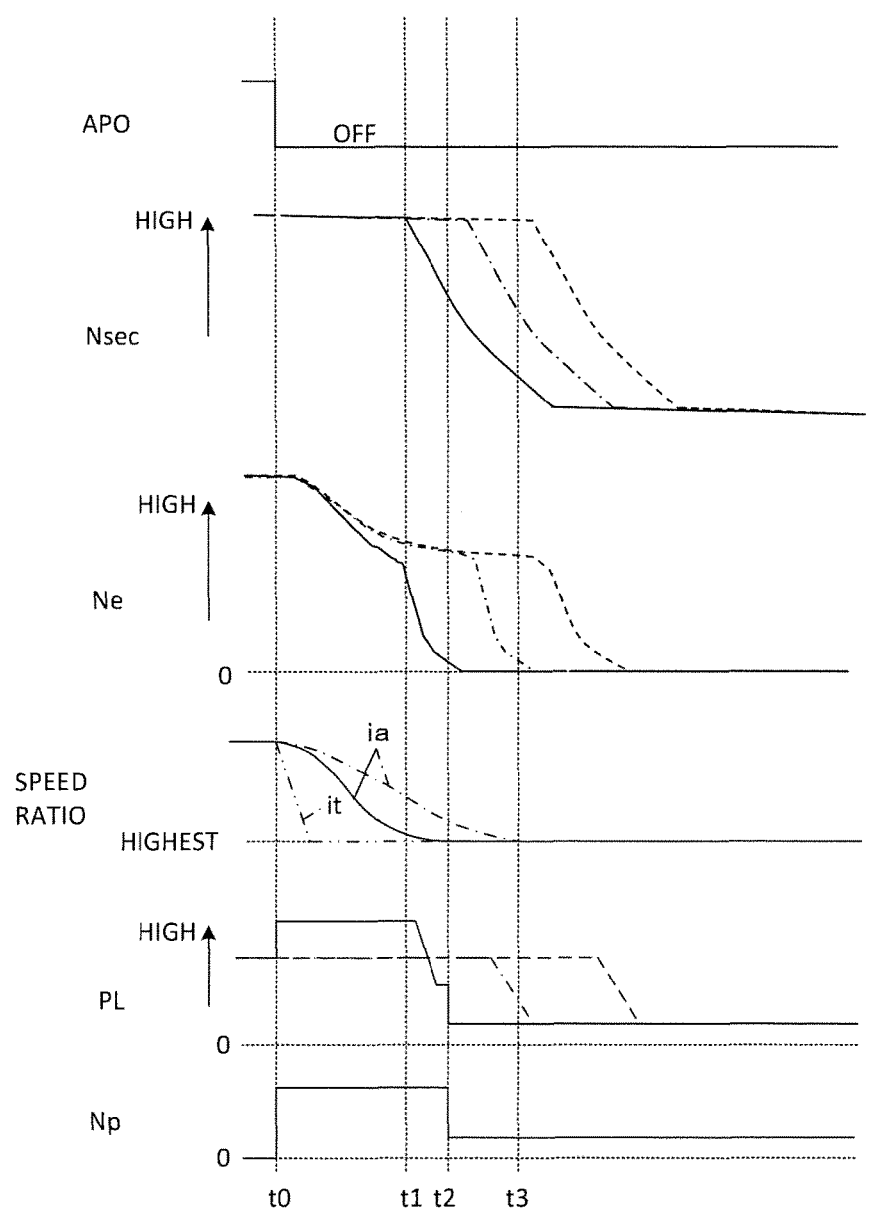
FIG. 10 is a time chart illustrating the coasting control according to the second embodiment.

The coasting control according to this embodiment will now be described using a time chart shown in FIG. 10. It is assumed here that the actual speed ratio ia of the variator 20 is not at Highest. In FIG. 10, variation in the actual speed ratio ia and so on according to the first embodiment is indicated by dot-dash lines, and variation in the actual speed ratio ia and so on when neither the first embodiment nor the second embodiment is employed is indicated by dotted lines.

At a time t0, the accelerator pedal 51 is released such that the accelerator pedal opening APO falls to zero. Further, the target speed ratio it of the variator 20 is modified to Highest, and the actual speed ratio ia of the variator 20 is modified toward Highest. As a result, the engine rotation speed Ne decreases. Moreover, the electric oil pump 10e is driven, leading to an increase in a rotation speed of a rotary shaft of the electric oil pump 10e (referred to hereafter as an electric oil pump rotation speed Np) and a corresponding increase in the line pressure PL. Here, although the accelerator pedal opening APO falls to zero, the actual speed ratio ia of the variator 20 remains on the Low side, and therefore the attained speed ratio ip does not reach Highest and the coasting control is not started. By driving the electric oil pump 10e, however, the actual speed ratio ia of the variator 20 is modified to the High side more quickly than the actual speed ratio ia according to the first embodiment.

When it is determined at a time t1 that the attained speed ratio ip is at Highest, the coasting control is started. Accordingly, the High clutch 33 of the sub-transmission mechanism 30 is disengaged and fuel injection into the engine 1 is halted, leading to reductions in the secondary pulley rotation speed Nsec and the engine rotation speed Ne. Moreover, as the engine rotation speed Ne decreases, the line pressure PL decreases. It should be noted that since the electric oil pump 10e is driven, the line pressure PL is maintained at a pressure corresponding to the amount of oil discharged from the electric oil pump 10e.

When the actual speed ratio ia reaches Highest at a time t2, the electric oil pump rotation speed Np is reduced. The electric oil pump rotation speed Np is controlled to a rotation speed at which the minimum pressure for ensuring that belt slippage does not occur in the variator 20 is supplied to the variator 20. As a result, the line pressure PL is maintained at a pressure at which belt slippage does not occur in the variator 20.

According to the second embodiment, by driving the electric oil pump 10e, the timing (the time t1) at which the attained speed ratio ip of the variator 20 reaches Highest can be advanced in comparison with the timing (the time t2) at which the attained speed ratio ip of the variator 20 reaches Highest in the first embodiment, and therefore the start timing of the coasting control can be advanced even further. As a result, the amount of fuel consumed by the engine 1 can be even further reduced, enabling a further improvement in fuel efficiency.

Figure 11:
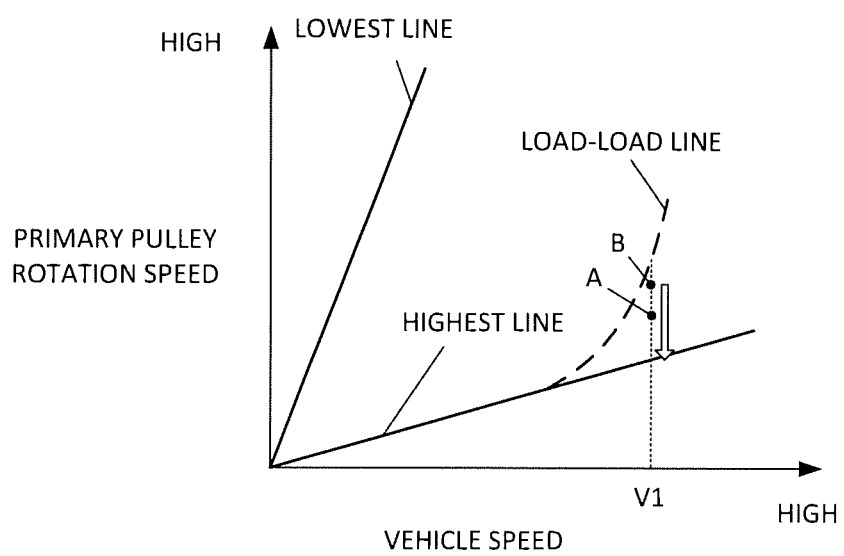
FIG. 11 is view illustrating the coasting control according to the second embodiment using a shift map.

Similarly to FIG. 7, it is assumed, for example, that the through speed ratio if of the transmission 4 is controlled on the basis of the load-load line, and that the accelerator pedal opening APO reaches zero when the vehicle speed VSP reaches the vehicle speed V1 on a shift map shown in FIG. 11.

In this case, according to the second embodiment, by driving the electric oil pump 10e, the attained speed ratio ip is determined to have reached Highest when the variator 20 is modified to a speed ratio at which the operating point of the variator 20 reaches a point B, which is on the Low side of the point A serving as the coasting control start timing according to the first embodiment, and the coasting control is started at this point. As a result, the start timing of the coasting control can be advanced while the speed ratio shifts toward Highest, as indicated by an arrow.

Effects of the second embodiment of the present invention will now be described.

Oil pressure is supplied to the primary pulley 21 during the coasting control using the oil discharged from the electric oil pump 10e. Therefore, a shift width in which the actual speed ratio ia of the variator 20 can be modified to Highest during the coasting control, or in other words the stroke amount Sp, can be increased. Accordingly, the timing at which the attained speed ratio ip reaches Highest can be advanced, whereby the start timing of the coasting control can be advanced, and as a result, the fuel efficiency of the engine 1 can be improved.

By driving the electric oil pump 10e when the accelerator pedal opening APO reaches zero, the actual speed ratio ia can be modified to Highest quickly. Therefore, the timing at which the attained speed ratio ip reaches Highest can be advanced, whereby the start timing of the coasting control can be advanced, and as a result, the fuel efficiency of the engine 1 can be improved.

By driving the electric oil pump 10e so as to maximize the discharge amount, the actual speed ratio ia can be modified to Highest quickly during the coasting control, and therefore the start timing of the coasting control can be advanced, enabling an improvement in the fuel efficiency of the engine 1.

Embodiments of the present invention were described above, but the above embodiments illustrate only a part of the example applications of the present invention, and the technical scope of the present invention is not limited to the specific configurations of the above embodiments.

In the above embodiments, the differential thrust Fp may be calculated in consideration of inertia of the variator 20. When the inertia of the variator 20 is large, the secondary pulley pressure Psec required to prevent belt slippage in the variator 20 increases, leading to a corresponding increase in the primary pulley pressure Ppri. Accordingly, the oil pressure that can be used by the variator 20 to perform a shift decreases. By taking the inertia of the variator 20 into account, the stroke amount Sp can be calculated accurately, whereby the attained speed ratio ip can be calculated accurately, and as a result, the start timing of the coasting control can be determined accurately.

The differential thrust Fp may also be calculated in consideration of amounts of oil leakage from the primary pulley 21 and the secondary pulley 22. In so doing, the attained speed ratio ip can be calculated accurately, whereby the start timing of the coasting control can be determined accurately. Moreover, the differential thrust Fp may be calculated in consideration of the amounts of oil leaking from the primary pulley 21 and the secondary pulley 22 when the actual speed ratio ia of the variator 20 is at Highest. By taking into account only the amounts of leakage when the actual speed ratio is of the variator 20 is at Highest, increased complexity in a method of calculating the differential thrust Fp can be suppressed.

In the second embodiment, the electric oil pump 10e is driven when the accelerator pedal opening APO reaches zero, but the electric oil pump 10e may be driven at the same time as the coasting control is started. In so doing, the power consumption of the electric oil pump 10e can be suppressed.

Further, in the second embodiment, the electric oil pump 10e may be driven when the oil pressure generated by the oil discharged from the mechanical oil pump 10m falls below the oil pressure generated by the oil discharged from the electric oil pump 10e. In so doing, the power consumption of the electric oil pump 10e can be suppressed.

In the second embodiment, an accumulator may be used instead of the electric oil pump 10e.

The coasting control according to the first embodiment may also be implemented in a vehicle having the configuration of the second embodiment.

The above embodiments were described using a vehicle that employs the engine 1 as a drive source, but the coasting control described above may also be applied to an electric vehicle that employs a motor as a drive source, or a hybrid vehicle. The coasting control may also be applied to a vehicle in which a friction engaging element is provided between the variator 20 and the engine 1.

With respect to the above description, the contents of application No. 2015-53545, with a filing date of Mar. 17, 2015 in Japan, are incorporated herein by reference.

The invention claimed is:

1. A vehicle control device for controlling a vehicle, the vehicle comprising:
   an oil pump driven by a drive source;
   a continuously variable transmission disposed between the drive source and a drive wheel such that oil discharged from the oil pump is supplied thereto; and
   a friction engaging element disposed in series with the continuously variable transmission between the drive source and the drive wheel,
   the vehicle control device comprising a controller configured to execute coasting control to disengage the friction engaging element and set a rotation speed of a rotary shaft of the drive source at zero when a predetermined condition, which includes at least a condition according to which an accelerator pedal is not depressed, is established,
   wherein the controller is configured to start the coasting control after predicting that an actual speed ratio of the continuously variable transmission will be modifiable to a target speed ratio of the coasting control during the coasting control, even in a case where the accelerator pedal is not depressed but the actual speed ratio has not yet reached the target speed ratio.

2. The vehicle control device according to claim 1, wherein the controller, after predicting that the actual speed ratio will be modifiable to the target speed ratio during the coasting control, starts the coasting control from a point at which the actual speed ratio is predicted to be modifiable.

3. The vehicle control device according to claim 1, wherein the controller is configured to calculate the actual speed ratio that will be attained during the coasting control on the basis of a differential thrust of a primary pulley of the continuously variable transmission, which is based on a current primary pulley pressure and a suppliable primary pulley pressure that will be suppliable following the start of the coasting control, and start the coasting control when the calculated actual speed ratio equals the target speed ratio.

4. The vehicle control device according to claim 1, further comprising an oil supply mechanism configured to supply oil to the continuously variable transmission when the drive source is stopped,
   wherein the controller is configured to increase a primary pulley pressure than before the coasting control is executed by discharging the oil from the oil supply mechanism during the coasting control.

5. The vehicle control device according to claim 4, wherein the controller is configured to start to discharge the oil from the oil supply mechanism when the accelerator pedal is released.

6. The vehicle control device according to claim 4, wherein the controller is configured to start to discharge the oil from the oil supply mechanism simultaneously with the start of the coasting control.

7. A vehicle control method for controlling a vehicle, the vehicle comprising:
   an oil pump driven by a drive source;
   a continuously variable transmission disposed between the drive source and a drive wheel such that oil discharged from the oil pump is supplied thereto; and
   a friction engaging element disposed in series with the continuously variable transmission between the drive source and the drive wheel,
   the vehicle control method comprising:
   executing coasting control to disengage the friction engaging element and set a rotation speed of a rotary shaft of the drive source at zero when a predetermined condition, which includes at least a condition according to which an accelerator pedal is not depressed, is established; and starting the coasting control after predicting that an actual speed ratio of the continuously variable transmission will be modifiable to a target speed ratio of the coasting control during the coasting control, even in a case where the accelerator pedal is not depressed but the actual speed ratio has not yet reached the target speed ratio.

8. A vehicle control device for controlling a vehicle, the vehicle comprising:

an oil pump driven by a drive source;

a continuously variable transmission disposed between the drive source and a drive wheel such that oil discharged from the oil pump is supplied thereto; and a friction engaging element disposed in series with the continuously variable transmission between the drive source and the drive wheel, the vehicle control device comprising control means for executing coasting control to disengage the friction engaging element and set a rotation speed of a rotary shaft of the drive source at zero when a predetermined condition, which includes at least a condition according to which an accelerator pedal is not depressed, is established, wherein the control means starts the coasting control after predicting that an actual speed ratio of the continuously variable transmission will be modifiable to a target speed ratio of the coasting control during the coasting control, even in a case where the accelerator pedal is not depressed but the actual speed ratio has not yet reached the target speed ratio.

* * * * *